United States Patent

[11] 3,583,535

| [72] | Inventor | Gunter F. Plamper<br>Lakewood, Ohio |
|---|---|---|
| [21] | Appl. No. | 793,339 |
| [22] | Filed | Jan. 23, 1969 |
| [45] | Patented | June 8, 1971 |
| [73] | Assignee | The M.T. & D. Company |

[54] VARIABLE SPEED DRIVE MECHANISM
20 Claims, 5 Drawing Figs.

[52] U.S. Cl. ................................................. 192/11,
74/218, 74/481, 180/53, 180/70
[51] Int. Cl. ....................................................... B60k 29/02
[50] Field of Search ............................................. 180/70, 33,
19; 74/230.17, 230.17 D, 218; 56/25.4; 192/11

[56] References Cited
UNITED STATES PATENTS

| 2,486,095 | 10/1949 | Armstrong .................... | 180/33 |
| 3,364,766 | 1/1968 | Ramo .......................... | 74/230.17(D) |
| 3,457,797 | 7/1969 | Ashton et al.................. | 74/230.17 |

*Primary Examiner*—A. Harry Levy
*Attorney*—Woodling, Krost, Granger and Rust

ABSTRACT: Mechanism for obtaining variable speed in driving a tractor or the like in which the driving is done through belts reeved on a motor-driven pulley and a wheel-driving pulley through the intermediary of a variable-speed sheave assembly about which the belts are reeved, and a variation in drive ratio is obtained by shifting the spacing of the axis of the sheave assembly relative to the axes, respectively, of the motor-driven pulley and wheel-driving pulley, the mechanism including means for discontinuing the driving engagement of a belt to one of the pulleys and for actuating a braking device in the same operation of discontinuing the driving operation.

Fig. I

INVENTOR.
GUNTER F. PLAMPER

ATTORNEYS.

VARIABLE SPEED DRIVE MECHANISM

My invention relates to belt drives for tractors and the like and in which variation in the driving ratio of the motor-driven pulley and wheel-driving pulley is obtained, such as for example as found in the class of mechanisms disclosed in U.S. Pats. No. 2,591,746 and No. 2,813,433.

An object of my invention is to provide improved mechanism for obtaining a variable drive ratio for a tractor or the like through a belt and pulley drive, for obtaining discontinuance of the driving engagement, and for actuating a braking device.

Another object is the provision of a practical, convenient and safe means for obtaining a variation in speed, a discontinuance of driving engagement, and an actuation of a brake.

Another object is the provision of a unique mechanism for controlling the speed or drive ratio of a tractor or the like, for clutching and declutching the driving train, and for setting and releasing the brake.

Other objects and a fuller understanding of this invention may be had by referring to the following description and claims, taken in conjunction with the accompanying drawings, in which:

Figure 1:
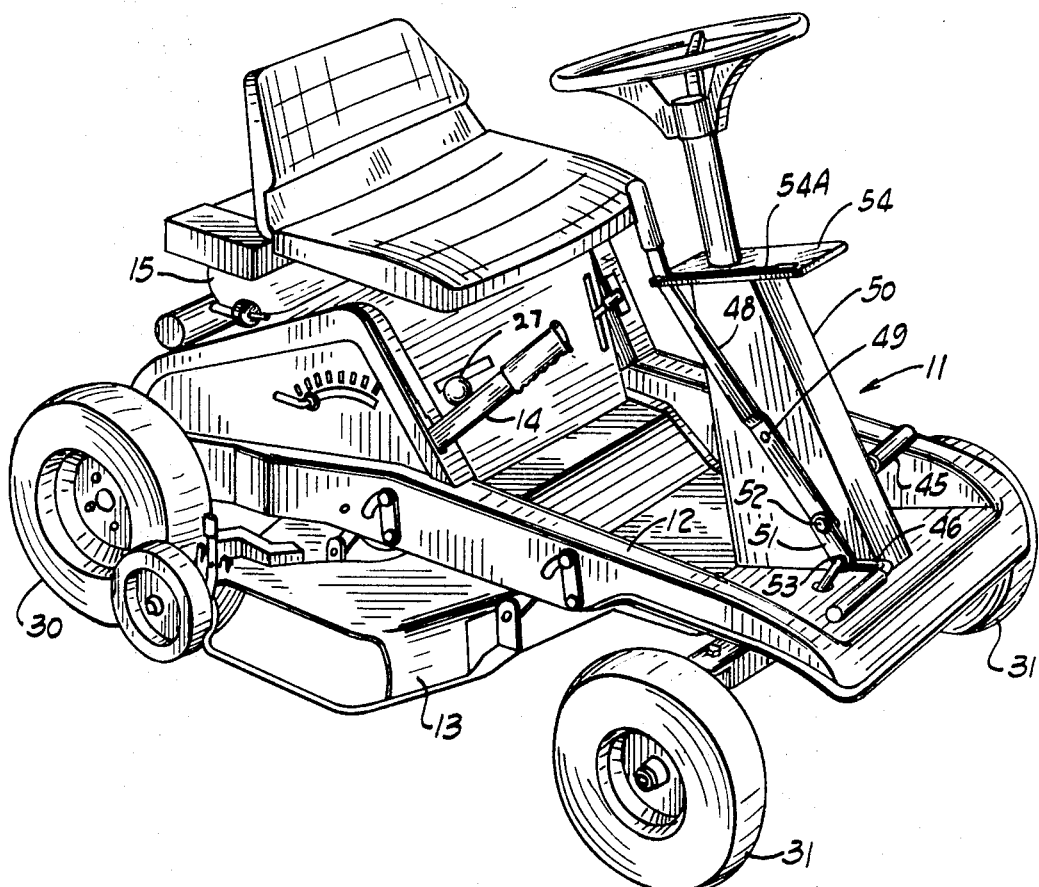
FIG. 1 is a perspective view of a mower tractor embodying a preferred form of my invention, and shown by way of example.

Although my invention is adaptable to other vehicles I have shown it and described it as applied to a tractor having a lawn mower cutting unit carried thereby. The tractor to which the preferred form of my invention has been applied is generally denoted in the drawings by the reference character 11. The tractor 11 has a frame 12 disposed in a generally horizontally plane. This frame is carried on front wheels 31 and rear wheels 30 in the usual manner.

The tractor 11 has shown mounted thereon a cutting unit 13 disposed below the frame 12. This cutting unit has a horizontally disposed rotatable blade rotated by a pulley 13A and another horizontally disposed cutting blade rotated by pulley 13B. The cutting unit 13 is raised and lowered by a linkage mechanism and height-control lever 14, as for example by the means illustrated in U.S. Pat. No. 3,357,165 which shows a comparable cutting unit so supported.

Mounted on the rear portion of the frame 12 there is the engine or motor 15 which may be of the usual internal combustion type. As better seen in FIGS. 2 and 4 there is carried on the rotating shaft of the engine or motor 15 an engine-driven pulley 16. This pulley has two parallel grooves for accommodating two belts. Reeved around the larger diameter sheave 16A of pulley 16 and the blade pulleys 13A and 13B is a belt 23 whereby rotation of the pulley 16 by the engine 15 causes the cutter blade driving pulleys 13A and 13B to rotate and consequently to cause the cutting blades to rotate for a cutting operation.

Figure 2:
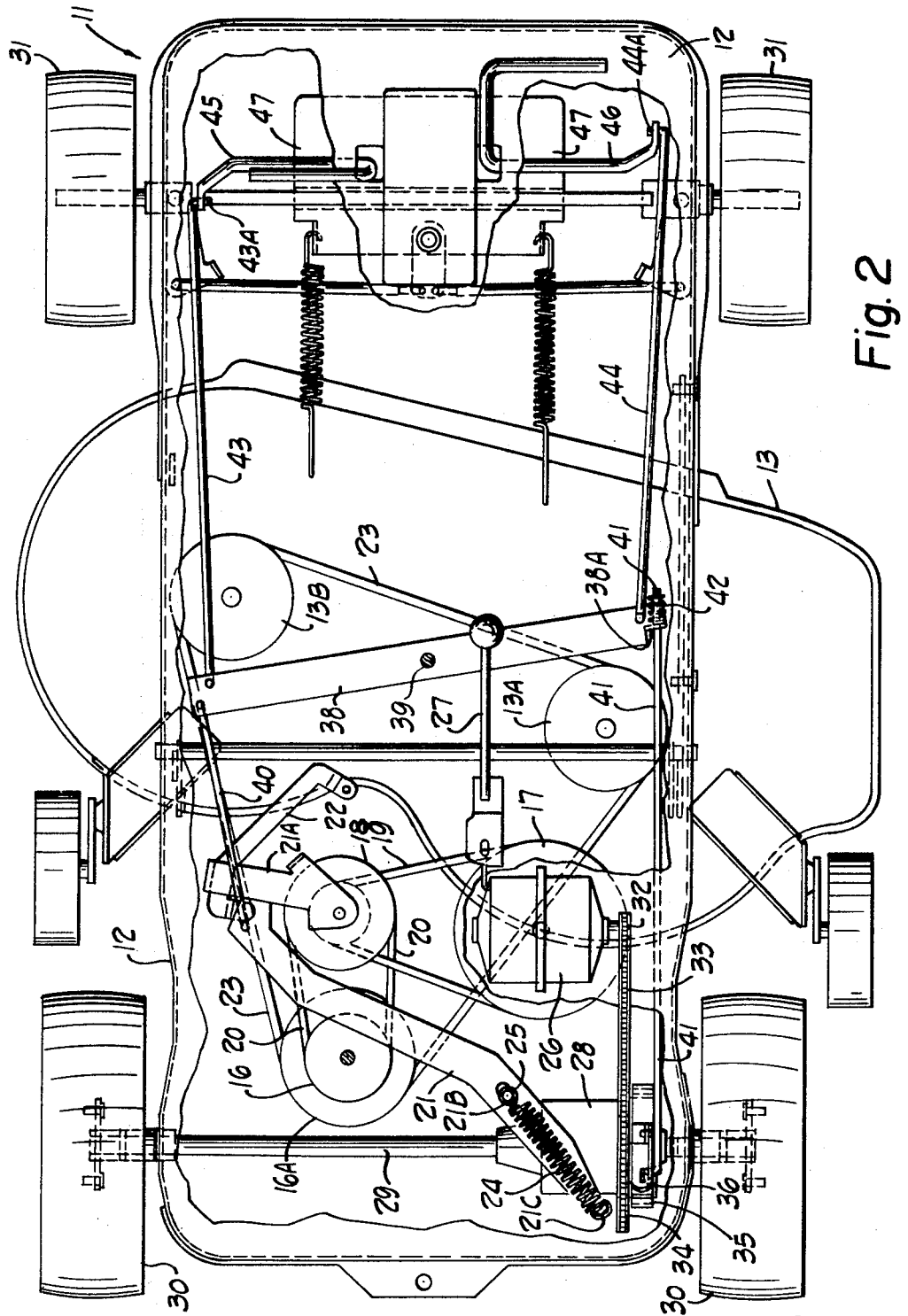
FIG. 2 is a horizontal or plan view of the tractor shown in FIG. 1 with the upper housing or structure removed to illustrate the disposition of parts on the lower portion of the tractor frame, and showing the tractor driving mechanism in low-speed and disengaged position.
Figure 4:
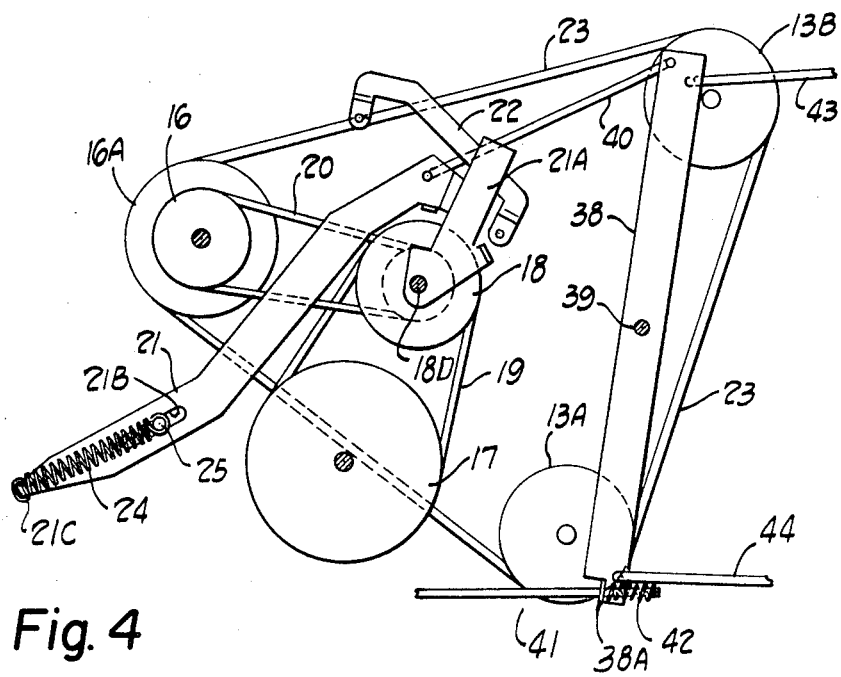
FIG. 4 is a horizontal or plan view of a portion of the tractor-driving mechanism shown in FIG. 2, but with the mechanism in high-speed and engaged position.

Spaced from the engine-driven pulley 16 is a wheel-driving pulley 17. The axes of the pulleys 16 and 17 are disposed parallel of each other and spaced apart as shown in FIGS. 2 and 4. The wheel-driving pulley 17 is nonrotatably carried on a shaft operatively connected with a gear mechanism 26. This mechanism 26 has gears therein which provide for alternate forward and reverse driving of the tractor through the selective shifting of the gears by means of a handle 27. Carried by and extending out from the gear mechanism 26 is a driving sprocket wheel 32 having a direction of rotation dependent upon the shifting of the gears in the mechanism 26 by the handle 27.

Mounted upon the rear axle 29 and extending between the rear wheels 30 is a differential mechanism 28. Operatively mounted on this differential mechanism 28 in the usual manner is a sprocket wheel 34 so as to drive the differential mechanism. A sprocket chain 33 operatively connects the small sprocket wheel 32 and large sprocket wheel 34 whereby the gear mechanism 26 drives the differential mechanism 28 and hence the axle 29 and wheels 30 through the usual differential action. Thus the pulley 17 drives the tractor wheels 30 through the gear mechanism 26, the sprocket wheels 32 and 34 and chain 33, through the differential mechanism 28 and axle 29.

Positioned at a variable distance from the two pulleys 16 and 17 is a variable speed sheave-assembly 18. The axis of the sheave-assembly 18 is parallel to the axes of pulleys 16 and 17 and variably spaced therefrom. A V-belt 20 is reeved around the pulley 16 and one groove of the sheave-assembly 18 and another V-belt 19 is reeved around the pulley 17 and the other groove of sheave-assembly 18.

Figure 5:
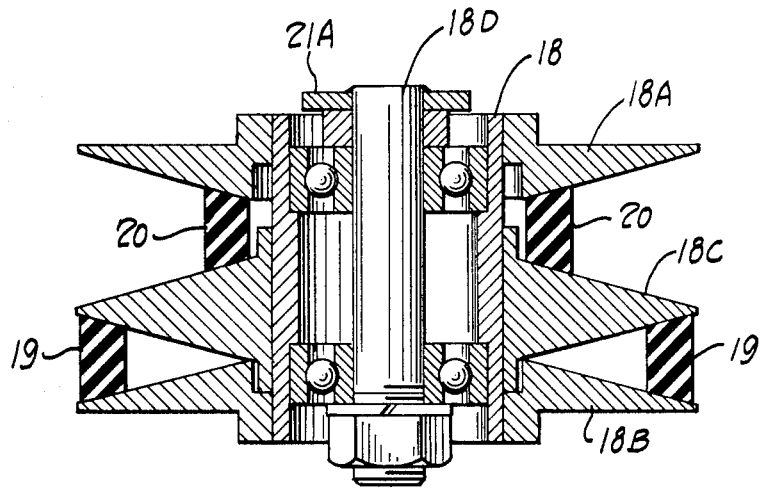
FIG. 5 is an enlarged sectional view of the variable speed sheave assembly utilized in the control mechanism illustrated in FIGS. 2, 3 and 4.

The detailed construction of the sheave-assembly 18 is shown in FIG. 5. The sheave-assembly 18 has two spaced fixed sheave halves 18A and 18B carried on an arbor or cylinder which in turn is journaled on a stud shaft 18D. Concentrically mounted on the arbor or sleeve of assembly 18 and slidable axially thereof between the fixed sheave halves 18A and 18B is a shiftable center sheave element 18C. By reason of the inclined sides of the sheaves forming the two grooves the center sheave element 18C slides longitudinally of the assembly 18 dependent upon the relative pull or tension of the two V-belts 19 and 20. As seen in FIG. 5 the tension on the V-belt 20 is relatively greater and hence the center element 18C is moved toward and adjacent the fixed sheave half 18B and away from the fixed sheave half 18A while at the same time the V-belt 19 being under relatively lesser tension has moved radially outward to the position illustrated. This operation of a shiftable sheave-assembly is well understood in the art.

The stud shaft 18D is carried by an arm member 21 which arm member 21 has a bracket portion 21A welded to its free end. As seen in FIG. 5 the stud shaft 18D is welded to the bracket portion 21A of arm member 21. The arm member 21 is pivotally swingable upon pivot pin 25 carried by and secured to the frame 12 of the tractor. The pivot pin 25 secured to the tractor frame extends through an elongated slot or opening 21B in the arm member 21 whereby the arm member 21 may both pivotally swing about the axis of pin 25 and also may move longitudinally relative to the pin 25 between the limits provided by the ends of the slot 21B. A coil spring 24 has one end secured to the outer end of the pivot pin 25 and has its other end secured to an anchor portion 21C formed on the end of the arm member 21 by bending up the end sufficiently to secure the spring 24 thereon. The tension or bias of the spring 24 is such as to urge the free end of the arm member 21, that is the end carrying the bracket portion 21A, away from the pin 25 and thus to resiliently bias the sheave-assembly 18 in a direction away from the pulleys 16 and and 17. This resilient bias provided by the spring 24 urging the arm member 21 in such direction aids in maintaining a driving tension on the two V-belts 19 and 20 and thus to maintain a driving engagement between the pulleys 16 and 17 under the resilient bias of the spring 24. The bracket portion 21A of the arm member 21 is slidably supported upon a support bar 22 carried by the frame 12 of the tractor. The outer end of the bracket 21A is free to slide in a generally horizontal plane along the support bar 22.

The driving ratio between pulleys 16 and 17 is varied by shifting the axis of the sheave-assembly 18 relative to the axes of the pulleys 16 and 17 and this shifting is done by the swinging of the arm member 21 about the axis of pivot pin 25. In this shifting of the axis of sheave-assembly 18 the belts 19 and 20 alternatively move radially inward and radially outward of the axis of sheave-assembly 18 so as to accommodate to the relative degree of pull or tension on the two V-belts as the axis of sheave-assembly 18 is shifted.

Mounted upon the axle 29 adjacent the differential mechanism 28 is a braking device 35 having an actuating lever 36 extending therefrom. The arrangement of the braking device is such that upon the swinging of the upper end of actuating lever 36 forwardly braking is applied to the tractor and upon the swinging of the actuating lever 36 rearwardly the braking action is released and the tractor is no longer braked.

Disposed forwardly of the pulleys 16 and 17 and sheave-assembly 18 and in the same general horizontal plane is a crossbar 38 pivotally carried intermediate of its ends by a pivot pin 39 fixedly secured to the tractor frame 12. As one end of the bar 38 is swung forwardly the other end is simultaneously swung rearwardly about the pin 39. Connecting a first end of the bar 38 is a rod 40 which is also connected to the arm member 21. The interconnections of the rod 40 with the arm member 21 and bar 38 are such that upon the swinging of the said first end forwardly, as in FIG. 4 for example, the sheave-assembly 18 on the arm member 21 is also swung forwardly and thus to effect a high-speed drive ratio between the pulleys 16 and 17. In this position of FIG. 4 the belt 20 is disposed relatively close to the axis of sheave-assembly 18 and belt 19 is disposed relatively far from the axis of sheave-assembly 18. When in this position the wheel-driving pulley 17 is driven at its highest rate of speed relative to the speed of pulley 16.

Connected to the other or second end of the bar 38 is a connecting rod 41 which has its rearwardmost end operatively connected to the braking device lever 36. The forward end of the rod 41 freely extends through and is slidable in an opening in flange 38A on said second end of bar 38. The fit of the rod 41 in the opening in flange 38A is such that the rod 41 may readily move therethrough. A coil spring 42 is mounted upon the forwardmost end of the rod 41 in advance of the flange 38A and has its forward end secured to the rod 41. The bias of the spring 42 is such as to resiliently urge the rod 41 forwardly when the said second end of the bar 38 has been swung forwardly such as illustrated in FIG. 2. However, when said second end of bar 38 has been swung rearwardly, as in FIG. 4, the braking device lever 36 is swung rearwardly and then spring 42 is relieved of tension and no further resilient bias is exerted on the braking device 35 by the spring 42.

On the left side of the tractor, which is the upper side in the view shown in FIG. 2, a rod 43 connected to the said first end of the bar 38 extends forwardly. This first actuating rod 43 has a forward turned-in end portion 43A as seen in FIG. 2. A first pedal actuator 45 on the left side of the tractor is connected at one of its ends to this turned-in end portion 43A in such manner that actuation of the pedal actuator moves the rod 43 forwardly upon downward and forward pressure on the pedal actuator 45. The frame 12 has secured thereto intermediate the front wheels 31 a bracket 47 formed to support the pedal actuator 45 and to permit the pedal actuator 45 to swing on the pivot axis provided by a transverse dwell portion in the bracket 47.

On the right side of the tractor, which is the lower portion shown in FIG. 2, there is a second actuating rod 44 having its rearward end operatively connected to bar 38 and extending forwardly therefrom. The forward end of the rod 44 has a turned-in portion 44A as seen in FIG. 2. A second pedal actuator 46 is similarly secured to the turned-in portion 44A so that forward and downward pressure on the outer free end of the pedal actuator 46 moves the rod 44 forwardly as seen in FIG. 2 and so that release of pressure on the pedal actuator 46 permits the rod 44 to move rearwardly and hence to permit the said second end of bar 38 to swing rearwardly. As in the case of the first pedal actuator 45, the second pedal actuator 46 is also pivotally carried by the bracket 47 in a dwell portion formed therein. As the dwell portions accommodating the two pedal actuators 45 and 46 are in axial alignment the rotatable shaft portion of the respective pedal actuators 45 and 46 are in axial alignment. By reason of the two pedal actuators 45 and 46 being connected through the respective rods 43 and 44 to the bar 38 it is seen that as one pedal actuator is depressed, such as the pedal actuator 46 in FIG. 2, then the other pedal actuator, such as 45, is simultaneously swung upwardly as shown in FIG. 2.

It is thus seen that the swinging of the bar 38 and hence the shifting of the axis of sheave-assembly 18 is provided by pressing downwardly and forwardly on one of the two alternative pedal actuators 45 and 46. For a low-speed drive ratio the right-hand pedal actuator 46 is depressed as in FIG. 2. For a high-speed drive ratio the left-hand pedal actuator 45 is depressed so as to move the sheave-assembly 18 to the position illustrated in FIG. 4.

Figure 3:
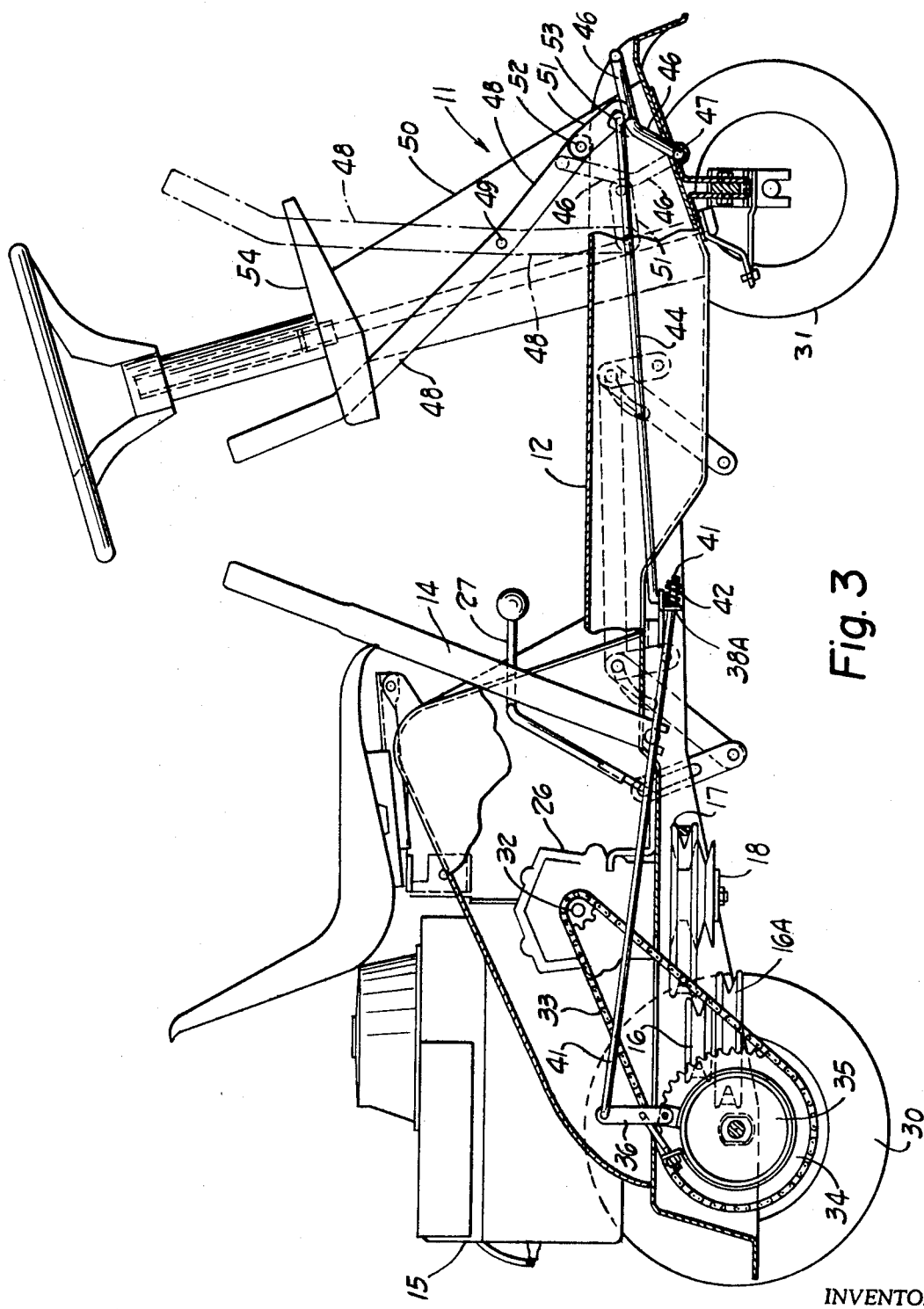
FIG. 3 is a longitudinal sectional view taken through the tractor of FIG. 1, with the cutting mower unit removed for purposes of clarity, and showing the disposition of the parts of my driving control mechanism.

The bar 38 may also be swung manually by means of a hand lever 48 pivotally carried on a pivot pin 49 secured to the steering post housing or front structure 50 of the tractor as shown in FIG. 3. Pivotally connected to the lower end of hand lever 48 by means of a pivot connection 52 is a link 51. The lower end of this link 51 is connected by a pivot connection 53 to the pedal actuator 46 at a point intermediate its outer free end and its pivotal mounting in bracket 47 as seen in FIG. 3.

The upper end of the hand lever 48 is guided in a slot 54A of a guide plate 54 secured to the steering post housing 50. This slot 54A permits the upper end of hand lever 48 to be swung both forwardly and rearwardly by the hand of the operator. In the position shown in full lines in FIG. 3 the upper end of hand lever 48 has been swung rearwardly and the lower end has been swung forwardly. By reason of the interconnection of the link 51 with the lower end of hand lever 48 and the pedal actuator 46 pedal actuator 46 is depressed forwardly and downwardly and thus is the sheave-assembly 18 moved toward its low speed drive ratio position. Upon the lever 48 being moved to the position illustrated in broken lines in FIG. 3 then the pedal actuator 46 moves upwardly to its raised position shown in broken lines in FIG. 3 and the sheave-assembly 18 is simultaneously moved to its high speed drive ratio position. Of course, intermediate positions of the lever 48 provide for intermediate drive ratios of the mechanism. It is noted that the pivot connection between the link 51 and lever 48 is such that there is provided a "toggle" or knee action whereby the swinging of the upper end of lever 48 to its rearwardmost position throws the axis of pivot connection 52 forwardly of a straight line between the axis of pivot connection 53 and pivot pin 49. When swung to this extreme position then the lever 48 tends to be so locked or held in that position and the pedal actuator 46 maintained in the depressed position shown in full lines in FIG. 3 by reason of the resilient bias of spring 42 urging the rod 44 rearwardly. In other words, upon the movement of the described "toggle" mechanism to beyond "dead center" to this extreme position the mechanism tends to be yieldably held to this beyond "dead center" position by the resilient bias of spring 48 acting, through an end of bar 38, on rod 44 which is operative interconnected to pedal actuator 46 at 44A and hence to lever 48 at 53, 51 and 52.

When the pedal actuator 46 is depressed to its extreme lowermost position and the upper end of lever 48 moved to its extreme rearwardmost position the said second end of bar 38 is swung forwardly against the bias of spring 42. This causes the rod 41 to swing the braking lever 36 forwardly and to apply braking action to the vehicle. The spring 42 intermediate the flange 38A and the forward end of rod 41 tends to maintain by resilient action a forward pull on the rod 41 and thus to maintain the braking device 35 in good braking position. At the same time the bias of spring 42 helps maintain or "lock" the lever 48 in its extreme rearward position by reason of the "toggle" or knee action between link 51 and the lower end of lever 48. However, by the operator manually pushing the upper end of lever 48 forwardly the bias of spring 42 is overcome to permit the upper end of lever 48 to be moved forwardly and the pedal actuator 46 to pivotally swing upwardly on the pivot support provided by bracket 47 (to its position shown in broken lines in FIG. 3). As pedal actuator 46 swings upwardly the left-hand pedal actuator 45 is simultaneously swung downwardly to depressed position by reason of the interconnection of the two rods 43 and 44 with the bar 38 as above-described.

Upon moving of the right-hand pedal actuator 46 to its extreme depressed position and the movement of the upper end of lever 48 to its extreme rearward position not only is the braking device 35 actuated but also the arm member 21 is moved longitudinally toward the pivot pin 25 against the bias of spring 24. As the length of rod 40 is such that after the sheave-assembly 18 has been first moved to its low-speed drive ratio position further rearward movement of sheave-assembly 18 causes the arm member 21 to move longitudinally and to also swing somewhat in an arc around the axis of pulley 17. The tension of belt 19 does not permit the sheave-assembly 18 when in this low-speed drive ratio position to move toward the axis of pulley 17 but the sheave-assembly 18 may move toward the axis of pulley 16 by reason of the "play" of pin 25 in slot 21B. This relatively short movement of the sheave-assembly 18 between its low speed position and its disengaged or declutched position is relatively small and difficult to illustrate in the drawings. In FIG. 2 the sheave-assembly 18 is shown as having been moved to its low-speed position and also having been moved a small additional amount to cause the V-belt 20 to be slack or relatively loose while the belt 19 is still taut or under tension. The spring 24 is shown as having been stretched somewhat from that illustrated in FIG. 4 to permit the arm member 21 to accommodate for this small additional movement of the sheave-assembly 18 rearwardly by the rod 40 having pushed the free end of the arm member 21 rearwardly. It will be understood that the relative length of rods 40, 41, 43 and 44 are such as to obtain the required predetermined shifting of the parts to provide the pulling and pushing functions above-described. The connections of the ends of rods 40, 41, 43 and 44 to the respective parts as described are nonrigid or "pivotal" so as to permit the required action in the operation described. At the same time, the rods 40, 41, 43 and 44 are stiff and rigid to provide not only a pulling action but also a pushing action to obtain the described operation.

In the operation of a tractor such as the mower tractor illustrated by way of example in the drawing, the driver on the seat of the tractor sits with his legs astraddle the steering post and with one foot on each pedal actuator. Upon depressing his left foot so as to press downwardly and forwardly on the pedal actuator 45 the tractor will move toward and into its high-speed drive ratio. The same action may be obtained by hand by the operator swinging the upper end of the lever 48 forwardly. Upon the operator desiring to drive slower he may press forwardly and downwardly with his right foot on pedal actuator 46 and move the mechanism toward and into low-speed drive ratio. Upon pressing still more upon the pedal actuator 46 to depress it to its extreme downward position then the mechanism is moved from its low-speed drive ratio into its disengaged or declutched position and at the same time the braking device 35 is actuated so as to brake the vehicle. Also the same action may be obtained by manually swinging the upper end of the lever 48 rearwardly, initially toward and into the low-speed drive ratio position and then sequentially by moving the upper end of lever 48 to its extreme rearward position the braking device is actuated to brake the vehicle and at the same time the driving train is disengaged or declutched and the engine is no longer operatively connected to the rear wheels. With the right-hand pedal actuator 46 in its extreme depressed position and the upper end of lever 48 in its extreme rearward position the "toggle" or knee action described holds the vehicle in braked condition and the driving train in declutched or inoperative condition. Only by the operator manually and purposefully moving the upper end of lever 48 forwardly can the driving train be put in driving condition and the wheels driven with the brake deactivated. The same drive ratios may be obtained in both forward and reverse directions of the tractor as when the gear mechanism 26 is shifted by handle 27 to either forward or reverse direction.

By the mechanism shown and described by way of example a very safe, convenient and versatile operation of such a tractor is obtained in an economical and practical manner and by a unique and novel arrangement, disposition and functioning of the parts.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. In a driving mechanism for a tractor or the like having a frame, a motor-driven pulley and a wheel-driving pulley, a variable-pitch sheave assembly, V-belt means operatively connecting said pulleys to said sheave assembly, an arm member pivotally carried by said frame, to swing about a pivot point on said frame, and carrying said sheave assembly, swinging movement of said arm member shifting the axis of said sheave assembly to modify the drive ratio of said pulleys, the combination of resilient biasing means operatively interconnecting said arm member and said frame for resiliently varying the distance between the axis of said sheave assembly carried by the arm member and said pivot point in a first direction to maintain driving tension on said V-belt means for transmission of power between said pulleys, operating mechanism carried by the frame for swinging said arm member and sheave assembly carried thereby about said pivot point to modify said drive ratio of said pulleys, said operating mechanism including supplemental means for varying the distance between said sheave assembly and said pivot point in opposition to said biasing means in a second direction to loosen the driving tension on said V-belt means for discontinuing the transmission of power between said pulleys, said biasing means and supplemental means being disposed relative to the said sheave assembly and pivot point for the moving of said sheave assembly in said second direction only upon the sheave assembly having been swung by said arm member to a position for low driving ratio between said pulleys.

2. The combination as claimed in claim 1 and in which said biasing means is a spring operatively interconnecting said frame and arm member yieldably to urge the arm member in said first direction, and in which said arm member is formed to permit limited movement in said first and second directions relative to said pivot point on said frame.

3. The combination as claimed in claim 1 and in which said supplemental means interconnected with said arm member and dimensioned to move the arm member in said second direction only after the arm member has carried the said sheave assembly away from the position for high driving ratio to beyond the position for low driving ratio to move said sheave assembly in said second direction only after said operating mechanism has moved said arm member carrying the sheave assembly to provide a drive ratio between said pulleys which drives the wheel-driving pulley at its low speed range.

4. The combination as claimed in claim 1 and in which said sheave assembly as it is moved in said first and second directions swings in an arc about the axis of said wheel-driving pulley to loosen and tighten the driving tension on said V-belt means.

5. In a driving mechanism for a tractor or the like having a frame, a motor-driven pulley journaled on the frame and a wheel-driving pulley journaled on the frame, a variable-pitch sheave assembly, V-belt means operatively connecting said pulleys to said sheave assembly, the axes of said pulleys being parallel and spaced-apart, and the axis of said sheave assembly being parallel to, and variably spaceable from, the respective axes of said pulleys, the combination of an arm member pivotally carried by the said frame to swing about a pivot point on said frame and carrying said sheave assembly to swing in an arc about said pivot point to variably space the axis of the sheave assembly from the respective axes of said pulleys in a range of positions between a low-speed position and a high-speed position and thereby to modify the drive ratio of said pulleys, lost-motion means operatively interconnecting said arm member and frame at said pivot point to permit the said sheave assembly to be moved between a driving position maintaining driving tension on said V-belt means and a nondriving position loosening driving tension on said V-belt means, biasing means urging the arm member carrying said sheave assembly toward driving position relative to said pivot point, and operating means operatively connected to said arm member for swinging said arm member about said pivot point to swing the sheave assembly carried thereby in said arc and thereby to modify the drive ratio of said pulleys, said operating means being arranged to move said arm member against said biasing means and to move the sheave assembly beyond the low-speed position of said range of positions and away from driving position relative to said pivot point and thereby loosen driving tension on said V-belt means.

6. The combination as claimed in claim 5 and which said lost-motion means is a pin in a slot, one of the pin and slot being carried by the frame and the other of the pin and slot being carried by the arm member, said pin providing said pivot point about which the arm member swings.

7. The combination as claimed in claim 6 and in which said biasing means is a spring interconnecting said pin and arm member and resiliently biasing the arm member in a direction to urge the sheave assembly toward belt-tensioning position.

8. The combination as claimed in claim 5 and including braking means for said tractor operatively interconnected with said operating means and arranged to actuate the braking means to braking position upon movement of said sheave assembly beyond said low-speed position away from said driving position and the loosening of the driving tension on said V-belt means.

9. The combination as claimed in claim 8 and including spring-biased overthrow toggle joint means operatively connected with said operating means for releasably urging said operating means to hold the sheave assembly in nondriving position and the braking means in braking position.

10. The combination as claimed in claim 5 and in which said operating means includes a pair of first pedals operable by the tractor operator and movable in opposite directions, the pressing of one pedal moving the operating means to cause the sheave assembly to move toward high-speed position, and pressing of the other pedal moving the operating means to cause the sheave assembly to move toward low-speed position and upon further pressing to cause the sheave assembly to move toward nondriving position.

11. In a tractor or the like having a frame, motor-driven pulley, a wheel-driving pulley, a variable-speed sheave assembly, the axes of said pulleys and sheave assembly being generally parallel, V-belt means operatively interconnecting said pulleys and sheave assembly and adapted to drive the wheel-driving pulley from the motor-driven pulley at a variable speed dependent upon the movement of the axis of the sheave assembly relative to the respective axes of the said pulleys through a range of movement between low-speed position and high-speed position, the combination of an arm member carrying said sheave assembly and pivotally swingable about a pivot point on said frame to swing the sheave assembly through said range of movement, connecting means operatively connecting said arm member and frame to permit swinging of the arm member on said pivot point and to permit longitudinal movement of the arm member relative to said frame for moving the said sheave assembly between V-belt tensioning position and V-belt loosening position, yieldable biasing means biasing the arm member in a longitudinal movement toward V-belt tensioning position, a bar having a first end and a second end, the bar being pivotally carried by said frame to swing said first and second ends in opposite directions, operating means operatively connected to said bar to swing said first and second ends in opposite directions, link means interconnecting said bar and arm member to swing said sheave assembly carried by the arm member through said range of movement between low-speed position and high-speed position, said link means also being arranged relative to the arm member to move said arm member against the bias of the yieldable biasing means longitudinally of the arm member to swing the said sheave assembly beyond said low-speed position in an arc about the axis of said wheel-driving pulley to said V-belt loosening position.

12. The combination as claimed in claim 11 and in which said operating means has a first actuating portion connected to said one end of the said bar and a second actuating portion connected to said second end of the said bar, said actuating portions being separably operable whereby actuation of one portion swings the bar in one direction and actuation of the other portion swings the bar in an opposite direction, the swinging of the bar moving the arm member through the link means to move the sheave assembly between high-speed and low-speed positions and between V-belt tensioning position and V-belt loosening position.

13. The combination as claimed in claim 11 and including braking means for the tractor operatively connected to said bar to actuate the braking means by the swinging of said bar, and including resilient means urging said braking means toward braking position upon said bar being swung sufficiently toward a stopping position to cause the link means to so move the arm member as to swing the sheave assembly to said V-belt loosening position.

14. The combination as claimed in claim 13 and including a toggle-joint mechanism adapted alternatively to hold the operating means in locked position for maintaining said bar in said stopping position and to permit the operating means to move for swinging of said bar, said toggle-joint mechanism being resiliently urged by said resilient means to said locked position upon the toggle-joint mechanism being manually placed in locked position by the operating means swinging the said bar to actuate the locking means to locked position.

15. Variable speed drive means for a tractor having a frame, a motor-driven pulley, a wheel-driving pulley, a variable-pitch sheave assembly having a plurality of sheaves having pitches variable relative to each other, said pulleys and said sheave assembly having generally parallel axes spaced from each other, V-belt means reeved about said pulleys and sheave assembly in a manner to vary the pitches of the sheaves of said assembly relative to each other and thus modify the drive ratio of said pulleys upon shifting of the position of the axis of the sheave assembly relative to the respective axes of the said pulleys in a range between low-speed position and high-speed position, comprising in combination first means carrying said sheave assembly for shifting the axis thereof through a first range of movement in an arcuate path about a pivot point between low-speed position and high-speed position relative to said pulleys, said first means including yieldable tensioning means urging said sheave assembly relative to said pivot point in a direction to maintain driving tension on said V-belt means through said first range of movement, and second means operatively connected to said first means for shifting the axis of the sheave assembly through a second range of movement in another path converging with said arcuate path toward and away from said pivot point between said low-speed position and in inoperative position, said second means having such length of stroke relative to the effective length of the V-belt means between the axes of the pulleys and sheave assembly and being so directed relative to said first range of movement that the sheave assembly moved by the second means in the second range of movement away from said low-speed position opposes said yieldable tensioning means and the sheave assembly under the restraint of the V-belt means reeved about one of the said pulleys moves against the urging of the yieldable tensioning means toward an inoperative position to relax the tension of the V-belt means reeved about the other of the said pulleys, said V-belt means being under driving tension in said low-speed and high-speed positions of the sheave assembly and intermediate said positions, and being in relaxed nondriving tension in said inoperative position of the sheave assembly, said second range of movement being successive to said first range of movement, and occurring only, after the second means has moved the axis of the sheave assembly from said first range of movement beyond said low-speed position in a direction away from said high-speed position.

16. The combination claimed in claim 15 and including braking means for braking said tractor, and third means operatively connected to said second means for actuating the braking means upon movement of the axis of the sheave assembly in said second range of movement toward said inoperative position of the sheave assembly, and for releasing the braking means upon movement of the second means in said second range of movement toward said low-speed position of the sheave assembly.

17. The combination claimed in claim 16 and in which said third means includes fourth means movable to locking position for releasably and jointly locking said sheave assembly in inoperative position and said third means in brake-actuated condition, said fourth means upon being moved to said locking position being biased to remain in locking position, said fourth means being manually releasable from said locking position to permit the said sheave assembly to be moved in said second range of movement toward low-speed position.

18. In a tractor having a frame, a motor-driven pulley, a wheel-driving pulley, V-belt means operatively connecting said pulleys, and including a sheave assembly, said sheave assembly having a plurality of sheaves rotatably mounted on its axis and having pitch diameters variable in inverse ratio to each other by said V-belt means upon varying the spacing of the axis of the sheave assembly relative to the respective axes of said pulleys, said sheave assembly being operatively disposed in said V-belt means for changing the drive ratio of said pulleys by movement of the sheave assembly to variably space the axis of the sheave assembly relative to the respective axes of said pulleys, the combination of an arm member pivotally carried by a pivot pin carried by said frame, said arm member carrying said sheave assembly to swing in a range of movement between high-speed position and low-speed position, said arm member having an elongated slot therein accommodating said pivot pin to permit the arm member to be moved longitudinally toward and away from the pivot pin, a spring interconnecting the frame and arm member and biased to urge said arm member in a direction resiliently holding the sheave assembly away from said pivot pin, a bar pivotally carried intermediate its ends to said frame, a first rod interconnecting said arm member and a first end of said bar to swing the arm member on said pivot pin in accordance with pivotal swinging of said bar, a braking mechanism for said tractor, a second rod connected to a second end of said bar and to said braking mechanism to operate the braking mechanism in accordance with the pivotal swinging of said bar, and a pair of manually operable actuators each independently connected to one of said rods arranged to provide that manual actuation of a first of said actuators in a first general direction moves the first rod, first end of the bar and arm member in a direction to swing the said sheave assembly toward high-speed position and the second actuator and second rod connected thereto is simultaneously moved in an opposite direction by said bar and the braking mechanism is moved by the second rod to inoperative position, and arranged to provide that manual actuation of a second of said actuators in said first general direction moves the second rod and second end of the bar in a direction to swing said sheave assembly toward low-speed position and the first actuator and first rod connected thereto is simultaneously moved in said opposite direction by said bar, the continued successive actuation of said second actuator in said first general direction moving the sheave assembly past said low-speed position to cause the sheave assembly carried by said arm member to move toward said pivot pin in said slot against the bias of said spring to loosen the driving tension on said V-belt means and simultaneously causing the braking mechanism to be moved by said second rod to braking position.

19. The combination claimed in claim 18 and including a lost-motion connection between said second rod and the second end of said bar, said lost-motion connection including a resilient member urging said second rod in a direction to urge the braking mechanism to an inoperative position upon the second actuator and second rod swinging said bar sufficiently far in a direction to exert a baising tension on the said resilient member.

20. The combination claimed in claim 19, and including a manually operable locking mechanism associated with said second rod to hold said second rod in a position to hold the braking mechanism in braking position, the locking mechanism being resiliently aided by the resilient member to be held in locked position and to be manually releasable against the bias of the resilient member to permit the second rod to move the braking mechanism to inoperative position.